United States Patent Office 3,332,048
Patented July 18, 1967

  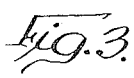
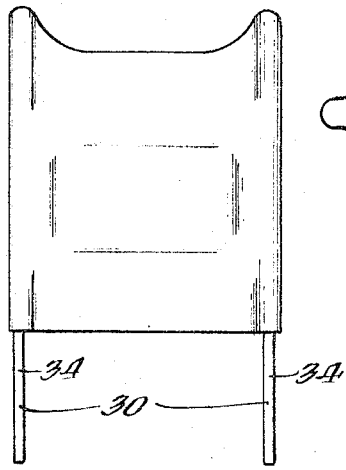  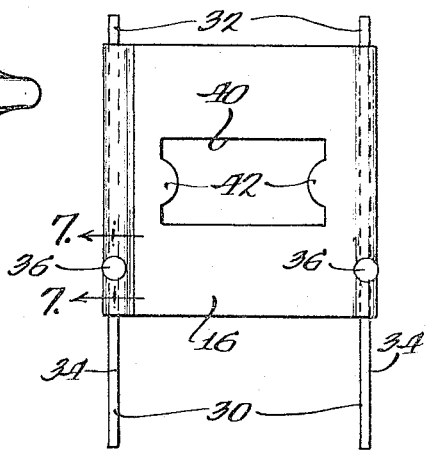
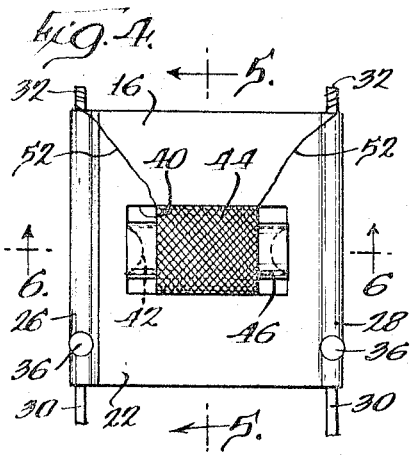 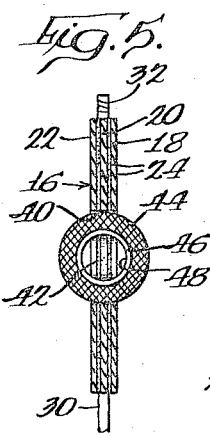 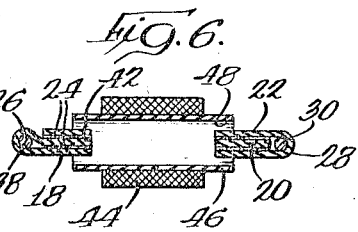
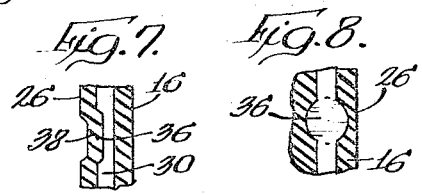
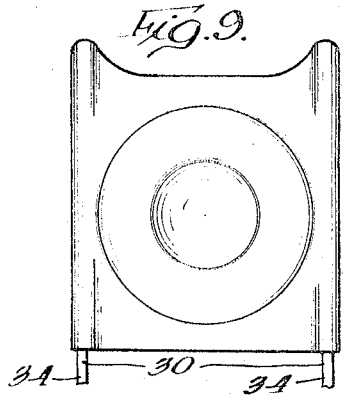 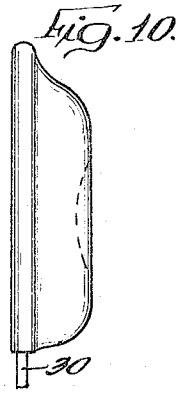 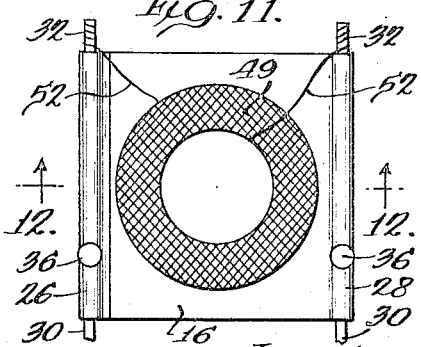

3,332,048
MOUNT FOR CIRCUIT ELEMENTS
John O. Renskers, Crystal Lake, Ill., assignor to Coilcraft, Inc., Cary, Ill., a corporation of Illinois
Filed Aug. 24, 1965, Ser. No. 482,123
5 Claims. (Cl. 336—65)

This invention relates to a mount for electric and electronic circuit elements or, more narrowly, for coils, transformers, etc., and to such elements so mounted for insertion into electronic and electric circuitry. This invention is related to the mounts disclosed in copending application Ser. No. 387,139, filed Aug. 3, 1964, by J. O. Renskers, C. S. Liebman, R. J. Salzman, and C. E. Schroeder.

In the above described application for patent, a mount for circuit elements is disclosed which is based on a rectangle of electrical paper and a pair of terminal wires secured to the paper along opposite edges thereof and having ends projecting beyond the edges of the paper.

In that application, a prior known device is described which consists of a rectangle of electrical grade fiberboard through which a pair of parallel staples are driven adjacent opposite edges of the fiberboard, and the legs of the staples then splayed out so that the staple ends extend above and below the board. The disadvantages of this structure are, as described there, that the stapling operation imposes a necessary limit on the length of the staple legs, and likewise demands that the staple legs be equal in length.

The invention described here enjoys the same advantages as those described in the above copending application. It permits the indefinite length of terminal leads and an unequal length thereof and it is compact, simple, sturdy and inexpensive. On the other hand it possesses certain additional advantages over those described in that application in that the mount or mounted coil may be completely encapsulated in the ordinary course of manufacture, the projection of the mounting board laterally beyond the terminal wires is held to a minimum, and the mounting board itself is possessed of a greater rigidity.

Other objects and advantages of this invention will be apparent from the following description and drawings of which:

FIG. 1 is a front elevational view of a first form of an encapsulated mounted coil embodying this invention;

FIG. 2 is a top plan view thereof;

FIG. 3 is a front elevation of an assembled coil mount;

FIG. 4 is a view similar to FIG. 3 showing a mounted coil prior to encapsulation;

FIG. 5 is a section taken along the line 5—5 of FIG. 4 looking in the direction of the arrows;

FIG. 6 is a section taken along the line 6—6 of FIG. 4 looking in the direction of the arrows;

FIG. 7 is an enlarged section taken substantially along the line 7—7 of FIG. 3 looking in the direction of the arrows illustrating the terminal wire crimp in side elevation;

FIG. 8 is an enlarged view similar to FIG. 7 illustrating the crimp of FIG. 7 in front elevation;

FIG. 9 is a view similar to FIG. 1 of an alternatively mounted coil encapsulated;

FIG. 10 is a side elevation of the mounted coil of FIG. 9;

FIG. 11 is a front elevation of the coil of FIG. 9 shown without the encapsulating material; and FIG. 12 is a section taken substantially along the line 12—12 of FIG. 11 looking in the direction of the arrows.

Considering particularly FIGS. 4 and 6, the first modification of the mounted coil illustrated consists of a square (or a rectangle) 16 of electrical grade fiberboard or some generally similar paperlike material which is formed from a strip of the board by a two-fold folding so as to result in three thicknesses of the paper in face to face contact with each other and cemented together.

The facing surfaces of the paper sections 18, 20 and 22 are secured together by an adhesive 24. The adhesive may consist of cellulose acetate, an epoxy thermosetting cement or virtually any pressure sensitive or thermosetting adhesive material involving either no cure time or a minimum thereof as in the case of a thermosetting material. The adhesive strength need not be high because, as will be later described, the essential strength of the structure will be derived from encapsulation rather than from internal adhesion.

The folds 26 and 28 are not sharp creases but are essentially rounded and contain the terminal wires 30. In the illustrated embodiment the wires extend through the folds a short distance above the square 16 as at 32 and a longer distance below the square as at 34. In the illustrated embodiment the wires are not glued in the folds 26 and 28. Their retention therein is provided by a crimp 36 shown in FIGS. 7 and 8 which amounts essentially to a flattening of the terminal wire by pressure exerted on it through the folds 26 and 28. The purpose of the crimp is simply to prevent longitudinal displacement of the terminal wires out of the folds during fabrication of the mounted coil and consequently need not be a strong attachment. As is evident in FIG. 7 the paper material of the fold is broken down as at 38 into the crimp 36.

To the extent thus far described, the two coil mounts illustrated are identical.

The mount illustrated in FIGS. 1 through 8 incorporates additionally a transverse rectangular window 40 having inwardly directed tongues 42 at opposite ends thereof.

The method by which the mount may be made involves feeding out two continuous lengths of wire for the terminal wires in properly spaced parallel paths, this feeding establishing a longitudinal direction of formation. In a first operation, a strip of paper will be transversely fed across the line of the wires and folded about the wires in the illustrated fashion. It is highly desirable that the free ends of the end strip portions 20 and 22 approach closely the opposite wire in order to have uniform thickness of the board across its width.

The application of the adhesive may be accomplished in many different ways. One conceivable method would involve passing a coated roller over the center portion of the strip 18 after its emplacement between the wires but prior to any folding, making the first fold 20 against the deposited adhesive, returning the roller so as to deposit a coating of adhesive on top of the end portion 20 of the strip and then making the second fold 22. Alternatively, of course, the paper or board could be coated over-all on one side with a pressure sensitive adhesive. In such case, the folding of the paper strip will constitue the whole of this first operation.

Longitudinally downstream of the first operation, a second operation may complete the mount. With a single stroke of an appropriate die, the terminal wires may be cut, the crimp formed and the window 40 in the modification illustrated in FIGS. 1 through 8 blanked out. At the same time, of course, a final squeeze may be given to the three-ply paper sandwich to effect a greater bond between the plies if insufficient force is applied in the folding step.

Thereafter the coil is mounted to the mounting board. In the situation illustrated in FIGS. 1 through 8, a coil 44 is shown mounted on a tubular form 46. The tongues 42 are proportioned to be contained within the central aperture 48 of the form. Thus the coil may simply be snapped into the window 40, the tongues 42 resiliently yielding to permit the passage of the coil into the window and returning to lodge within the central aperture 48 of the form to retain the coil in position.

In the case of the form illustrated in FIGS. 9 through 12, the coil 49 is a universally wound coil. As illustrated here, one face of the coil is coated with an adhesive 50 and the coil is thereby cemented to one side or the other of the mounting board 16 between the terminal wires 30. It will be appreciated however that the universally wound coil may be mounted in a window like the window illustrated in FIG. 3 in exactly the same fashion as the tubular form coil.

In both types of coil shown, the lead wires 52 are wrapped around the short upper ends 32 of the terminal wires 30 and may be soldered thereto by a solder dip. Finally the whole coil assembly may be dipped into a Durez dip, a phenol-formaldehyde product of Durez Plastics & Chemicals, Inc., and heat treated so as to encapsulate the entire assembly except for exposed long ends 34 of the terminal wires 30.

It will be apparent from the foregoing description that a coil mount and mounted coil has been described here which meets admirably the assigned objectives. As compared for instance with the devices of the application referred to above, it possesses the notable advantage of having the terminal wires situated on the very edge of the mounting board rather than spaced somewhat inwardly therefrom. Such a structure demands less space on a printed circuit board and likewise has a superior appearance. Also, in the application referred to above, the end product is a string of mounted coils interconnected by the edges of the mounting boards with the terminal wires extending transversely of the string. As coils are wanted, individual ones are broken off the strings. This has the effect of leaving a ragged edge and a mounting board surface—the broken edge—exposed to the atmosphere. This is not only less esthetically appealing, it likewise permits the absorption into the encapsulated coil of atmospheric moisture. The device here is wholly encapsulated.

It will be further appreciated that the nature and method of application of the coil mounts are singularly well suited to automatic coil assembly operation. The method of formation of the mount permits a simple automatic attachment of the coil thereto and likewise a simple encapsulating dip if such is desired. It will be appreciated incidentally that the mounted coils as illustrated here may not in some circumstances require encapsulation; they may be employed as illustrated, for instance, in FIG. 4 or FIG. 12.

It will likewise be understood that there have been described here two embodiments only of the invention and that many alternatives both as to structure, material or method will suggest themselves to those skilled in the art. It is therefore desired that this invention be regarded as being limited only as set forth in the following claims.

I claim:
1. A mount for electrical and electronic circuit elements comprising a strip of paper-like material having a center portion and end portions, said end portions being folded and adhesively secured against said center portion to define three, bonded-together plies, and terminal wires contained longitudinally in the bights of said folds.

2. The combination as set forth in claim 1 wherein said end portions fall narrowly short of the opposite fold.

3. The combination as set forth in claim 1 wherein said terminal wires extend a short distance beyond said folded strip at one end and a greater distance beyond said strip at the other end.

4. A mounted circuit element comprising a strip of electrically insulating sheet-like material having a center portion and end portions, said end portions being folded against said center portion to define three, bonded-together plies, a terminal wire contained longitudinally in the bight of each fold and extending beyond said strip at one end, and a circuit element mounted on said strip between said terminal wires and having leads secured to said terminal wire ends.

5. A mounted coil comprising a strip of electrically insulating sheet-like material having a center portion and end portions, said end portions being folded against said center portion to define three plies, a terminal wire contained longitudinally in the bight of each fold and extending a short distance beyond said strip at one end and a greater distance beyond said strip at the other end, a coil mounted on said folded strip and having leads secured to said short terminal wire ends, and electrically insulating means encapsulating all of said mounted coil except said long terminal wire ends.

References Cited

UNITED STATES PATENTS

| 2,703,854 | 3/1955 | Eisler | 336—192 X |
| 2,864,064 | 12/1958 | Heaton | 336—65 |
| 2,965,865 | 12/1960 | Zack | 336—65 |
| 3,271,717 | 9/1966 | Gilbert | 336—192 |

FOREIGN PATENTS 198,739   6/1923   Great Britain.

LEWIS H. MYERS, *Primary Examiner.*

E. GOLDBERG, *Assistant Examiner.*